(12) United States Patent
Mori et al.

(10) Patent No.: US 7,257,136 B2
(45) Date of Patent: Aug. 14, 2007

(54) LASER APPARATUS

(75) Inventors: Atsushi Mori, Yamanashi (JP); Ryoma Okazaki, Yamanashi (JP); Minoru Ando, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/230,653

(22) Filed: Sep. 21, 2005

(65) Prior Publication Data

US 2006/0060571 A1    Mar. 23, 2006

(30) Foreign Application Priority Data

Sep. 21, 2004   (JP) ............................ 2004-273070

(51) Int. Cl.
*H01S 3/121* (2006.01)
(52) U.S. Cl. ............... 372/14; 219/121.62; 219/121.83
(58) Field of Classification Search .................... 372/9, 372/35, 34, 38.01, 36; 219/121.6
See application file for complete search history.

(56) References Cited

U.S. PATENT DOCUMENTS

| | | |
|---|---|---|
| 4,760,583 A | 7/1988 | Sasnett et al. |
| 4,937,422 A * | 6/1990 | Nagamine et al. ..... 219/121.61 |
| 5,043,555 A * | 8/1991 | Iehisa et al. ........... 219/121.62 |
| 5,825,801 A * | 10/1998 | Nishida et al. ................ 372/99 |
| 6,073,464 A * | 6/2000 | Boher et al. ................... 65/378 |
| 7,092,413 B2 * | 8/2006 | Yamazaki et al. .............. 372/9 |
| 2005/0195867 A1 * | 9/2005 | Egawa et al. .................. 372/33 |

FOREIGN PATENT DOCUMENTS

| | | |
|---|---|---|
| EP | 0 419 671 | 4/1991 |
| JP | 7-106678 | 4/1995 |
| JP | 10-135542 | 5/1998 |
| JP | 10-229229 | 8/1998 |
| JP | 2000-94173 | 4/2000 |

OTHER PUBLICATIONS

European Search Report and Annex of EP Application No. 05 02 0363 dated Jan. 20, 2006.

* cited by examiner

*Primary Examiner*—Minsun Oh Harvey
*Assistant Examiner*—Xinning Niu
(74) *Attorney, Agent, or Firm*—Staas & Halsey LLP

(57) ABSTRACT

A laser apparatus (100) for performing the laser machining operation by condensing the laser light output from a laser oscillator (3) is disclosed. A laser output value calculation unit calculates a laser output value (L1) based on a command value (L0) issued to a laser oscillator (2). A temperature change estimating unit (31) estimates the temperature change or the temperature (Te) of specified component element(s) (7a, 7b) of the laser apparatus based on the elapsed time (t) and the laser output value calculated by the laser output value calculation unit. An adjusting unit (32) adjusts the conditions for controlling the laser or the conditions for laser machining based on the temperature change or the temperature of the specified component element estimated by the temperature change estimating unit. A stable laser machining operation is performed without a temperature sensor. The laser output value (L1) may be measured by a laser power sensor (5).

20 Claims, 5 Drawing Sheets

LASER APPARATUS

BACKGROUND OF THE INVENTION

1. Field of the Invention

This invention relates to a laser apparatus including a laser oscillator for producing a laser output by exciting a gas or a solid medium, or a laser machine, namely laser beam machine, for a machining operation such as cutting or welding, using the laser output from the laser oscillator.

2. Description of the Related Art

Generally, a laser apparatus mainly comprises a laser oscillator, an optical transmission system for transmitting and condensing light, a device for driving a work, auxiliary equipment and a control unit for controlling these component parts. An ordinary laser apparatus used for the laser cutting operation, for example, includes a laser oscillator, a machining table driven in X, Y and Z directions, an optical transmission system having a reflector, a laser machining head for condensing the laser light, an assist gas supply system for supplying an assist gas to the laser head, a cooling water circulation unit for cooling the laser oscillator, the optical transmission system and the machining head, a dust collector, a laser medium supply system and a CNC (computer numerical control) for controlling these component parts. Further, the laser oscillator is configured of a laser gas circulation cooling system, a resonator, a discharge tube system, a power supply for supplying the exciting energy to the discharge tube and a laser control unit for controlling these component parts. In a conventional technique, the CNC may double as a laser control unit.

This laser apparatus has various sensors. The most common sensor is a laser power sensor. When a part of the laser light recovered from a rear mirror is radiated on the laser power sensor, the laser power sensor measures the temperature increase thereby to calculate the heat flow rate and detect the laser output. The laser apparatus also includes sensors for measuring the temperature, pressure, flow rate, current and/or voltage of various media. Based on the measurements of these sensors, the laser apparatus appropriately outputs an alarm and performs a predetermined feedback control operation. In this way, the laser apparatus outputs a stable laser output and realizes a stable laser machining operation in spite of various disturbances.

The current tendency is toward a further increased output of the laser oscillator used for the laser apparatus. At various points of the laser apparatus, therefore, a considerable difference arises between the temperature immediately following the start operation of the oscillator and the temperature during the steady operation thereof. The laser apparatus is a complicated and precise device having a multiplicity of subsystems as described above, and the characteristics of these subsystems may change with temperature as described above.

The central portion of the condensing lens in the neighborhood of the machining head is heated, for example, by the high-output laser transmitted therethrough, resulting in a temperature difference between the central portion and the peripheral portion of the condensing lens. The central portion of the lens expands and the refractive index of the central portion of the lens undergoes a change, thereby leading to what is called a thermal lens effect in which the actual focal length is changed. As a result, the optimum position of the lens with respect to the surface of the work to be machined may be different at the time of starting the laser machining operation and during the steady operation.

In the laser oscillator, on the other hand, the laser gas constituting a laser medium increases in temperature due to the discharge. As a result, the laser gas expands, and therefore the laser gas supply system is disturbed. Thus, the laser gas pressure control is upset thereby causing the irregularities of the laser output and discharge voltage. At the same time, the discharge tube and the discharge electrodes are heated, and therefore the discharge characteristic is changed. Further, the resonator body is distorted by thermal expansion, so that the laser output at the time of laser activation and during the steady operation may be different.

To cope with this problem, Japanese Unexamined Patent Publication No. 2000-94173 discloses a configuration in which the temperature of a condensing lens is measured thereby to control the optimum lens position due to the thermal lens effect. Also, Japanese Unexamined Patent Publication No. 10-229229 discloses a method in which the laser gas temperature is detected, and, after warming an oscillator up to the laser gas temperature at which the laser light is stabilized, the laser light is radiated thereby to improve the laser output control. In this case, the temperature of each component element of the oscillator is measured while at the same time securing the required warm-up operation thereby to obtain a stable output.

Further, Japanese Unexamined Patent Publication No. 7-106678 discloses a configuration in which the laser gas temperature and the discharge electrode temperature are measured and, based on these temperatures, the laser apparatus is controlled.

As described above, the temperature of each component element of the laser apparatus is measured and based on the characteristic change corresponding to the measured temperature, the laser apparatus is controlled. In this case, the laser output can be stabilized and the stable laser machining operation can be realized within a comparatively short time after starting the laser.

Installation of the temperature sensors on the component elements of the laser apparatus such as the discharge electrodes and the condensing lens, however, requires a physical space. Also, even in the case where the installation is possible, the temperature of a specified component element such as the discharge electrodes impressed with a high voltage and the central portion of the condensing lens cannot be easily measured, and therefore it is not an easy matter to continuously detect the temperature accurately while the laser apparatus is driven. Further, these sensors, of course, are costly, and a temperature sensor of high response rate that can produce a real output within one millisecond from an output command such as for the laser is very expensive. The temperature sensor having such a high response rate cannot be realistically used for every part of the laser apparatus.

To obviate this problem, Japanese Unexamined Patent Publication No. 10-135542 discloses a configuration in which in order to control the laser output in accordance with the characteristic change with the temperature of a laser medium, the effect of the temperature rise of the laser gas providing a laser medium is produced as a parameter from the laser output time, the laser output immediately preceding to the present time point and the off time.

In view of the fact that a high-performance high-output laser apparatus currently available has a high-performance heat exchanger as a laser gas cooler, the temperature of the laser gas supplied to the laser oscillation area is very stable. Also, the laser apparatus has a strong laser-gas blower, so that the laser gas in the laser oscillation area is replaced entirely within one millisecond. Although the temperature of the laser gas can be stabilized within several milliseconds after starting the laser output, however, the component elements of the laser apparatus such as the optical parts making up the discharge electrodes, the discharge tube and the resonator cannot be cooled within as short a time as the laser gas can. During the period of several seconds to several minutes after the start of the laser output, therefore, the characteristics of these component elements undergo a change with temperature. For this reason, the laser apparatus cannot be actually controlled properly in accordance with the temperature change of each specified component element based on the method disclosed in Japanese Unexamined Patent Publication No. 10-135542.

In these patent publications, the cooling process is not sufficiently taken into consideration, and therefore the laser apparatus disclosed in these patent publications cannot be used for the continuously-changing laser control operation. It is for this reason that these patent publications relates to the pulse oscillation. Actually, the high-output laser often transfers to a machining operation with a continuous low output or a low-duty pulse output immediately after the machining operation with the rated maximum output. In such a case, in spite of the continued laser output, the laser apparatus as a whole enters a cooling process. If the control is operated in accordance with the time when the laser output is off, therefore, a higher accuracy cannot be achieved. This problem is shared by Japanese Unexamined Patent Publication No. 7-106678.

The object of this invention is to provide a laser apparatus which obviates the above-mentioned problem of the prior art and can operate stably for a long time without any temperature sensor as a component element.

SUMMARY OF THE INVENTION

In order to achieve the object described above, according to a first aspect of the invention, there is provided a laser apparatus comprising a laser oscillator, a laser machine for conducting the laser machining operation by condensing the laser light output from the laser oscillator, a laser output value calculation means for calculating the laser output value based on a command value to the laser oscillator, a temperature change estimation means for estimating the temperature change or the temperature of a specified component element of the laser apparatus based on the laser output value calculated by the laser output value calculation means and the elapsed time, and an adjusting means for adjusting a selected one of the conditions for the laser control operation of the laser oscillator and the conditions for the laser machining operation of the laser machine based on the temperature or the temperature change of the specified component element estimated by the temperature change estimation means.

Specifically, in the first aspect of the invention, the temperature change or the temperature of a specified component element such as discharge electrodes can be estimated and calculated based on the laser output value and the elapsed time in the design and development stage. Therefore, by adjusting the conditions for controlling or machining operation of the laser oscillator and the laser machine of the laser apparatus based on the estimated value of the temperature change or the temperature of a specified component element, a stable laser machining operation can be conducted for a long time without actually measuring the temperature of the specified component element or without using the temperature sensor. The laser output value is desirably the average value for a predetermined period of time.

According to a second aspect of the invention, there is provided a laser apparatus of the first aspect, wherein the laser output value is calculated using at least one of the laser output command value, the command output peak value, the command pulse frequency and the command pulse duty cycle.

Specifically, in the second aspect of the invention, these output values are determined by simple calculation from the command value to the laser oscillator or by use of a predetermined map. The laser output determined in this way represents the thermal effect based on pulse output as the on/off output on each component element, and therefore based on the laser output and the elapsed time, the temperature change or the temperature of a specified component element can be easily estimated.

According to a third aspect of the invention, there is provided a laser apparatus of the first aspect, wherein the laser output value is calculated using at least one of the command discharge voltage value, the command discharge current value, the command pulse frequency and the command pulse duty cycle.

Specifically, in the third aspect of the invention, a command discharge voltage value, etc. more related to a specified component element is used and therefore a more accurate laser output value can be calculated.

According to a fourth aspect of the invention, there is provided a laser apparatus comprising a laser oscillator, a laser machine for conducting the laser machining operation by condensing the laser light output from the laser oscillator, a laser output value measuring means for measuring the laser output value through a laser power sensor, a temperature change estimating means for estimating the temperature change or the temperature of a specified component element of the laser apparatus based on the laser output value measured by the laser output value measuring means and the elapsed time, and an adjusting means for adjusting the conditions for the laser control operation of the laser oscillator or the conditions for the laser machining operation of the laser machine based on the temperature change or the temperature of the specified component element estimated by the temperature change estimation means.

Specifically, in the fourth aspect of the invention, the actual laser output is measured and, therefore, the temperature change or the temperature of a specified component element can be estimated with a higher accuracy. Also, by adjusting the conditions for the control operation or the machining operation of the laser oscillator and the laser machine of the laser apparatus based on the estimated value of the temperature change of the specified component element, the stable machining operation can be performed over a long period of time without actually measuring the temperature of the specified component element, i.e. without using the temperature sensor. For measurement of the laser output, a laser power sensor with a fast response is desirably used. As an alternative, however, the response time constant of the laser power sensor is measured in advance and the laser output for the actual time maybe calculated from the change rate of the laser power sensor output under predetermined output conditions.

According to a fifth aspect of the invention, there is provided a laser apparatus in any one of the first to fourth aspects, wherein the temperature of the specified component element is estimated based on the internal or external temperature of the laser apparatus or the temperature of a cooling water for the laser oscillator and the temperature change estimated by the temperature change estimation means.

Specifically, in the fifth aspect of the invention, the temperature of a specified component element of the laser apparatus can be determined from the measured temperature and the laser output, and therefore accurate control operation is made possible based on the estimated temperature.

According to a sixth aspect of the invention, there is provided a laser apparatus in any one of the first to fifth aspects, wherein the temperature change or the temperature of the specified component element of the laser apparatus is calculated from selected one of a exponential function model or a first-order lag model.

Specifically, in the sixth aspect of the invention, although the specified component element may undergo a constant temperature change at the time of laser output, the temperature change or the temperature can be simply and accurately calculated by use of the exponential function or the first-order lag model. Incidentally, in the case where the first-order lag model is used, the time constant may be the same or different between the heating and cooling operation.

According to a seventh aspect of the invention, there is provided a laser apparatus in any one of the first to fifth aspects, wherein the specified component element of the laser apparatus is at least selected one of one of a discharge tube, a discharge electrodes, a laser gas, a excitation light lamp and a excitation laser diode.

Specifically, in the seventh aspect of the invention, the control conditions are changed in accordance with the characteristic change due to the temperature change of each element constituting the laser oscillator thereby to produce a stable output.

According to an eighth aspect of the invention, there is provided a laser apparatus in any one of the first to fifth aspects, wherein the specified component element of the laser apparatus is a condensing lens or a variable curvature mirror and the conditions for the laser machining operation are the distance between the condensing lens and the work or the curvature of the variable curvature mirror.

Specifically, in the eighth aspect of the invention, the thermal lens effect generated by transmission of the laser beam through a translucent optical part can be corrected by changing the machining conditions.

According to a ninth aspect of the invention, there is provided a laser apparatus in any one of the first to fifth aspects, wherein the laser machining operation is suspended until the temperature of the specified component element of the laser apparatus reaches a predetermined temperature.

Specifically, in the ninth aspect of the invention, the standby time before the thermal lens effect is stabilized can be reduced to the required minimum.

According to a tenth aspect of the invention, there is provided a laser apparatus in any one of the first to fifth aspects, wherein the operation of the laser apparatus is suspended in the case where the temperature of the specified component element of the laser apparatus reaches a predetermined critical temperature.

Specifically, in the tenth aspect of the invention, a laser power exceeding the critical output of the continuous operation, i.e. the continuous rated output, can be output for a short in time and intermittently.

According to an 11th aspect of the invention, there is provided a laser apparatus in any one of the first to fifth aspects, wherein in the case where the temperature of the specified component element of the laser apparatus reaches a predetermined warm-up completion temperature, it is determined that the warm-up operation for starting the laser apparatus is completed.

Specifically, in the 11th aspect of the invention, the warm-up operation is made possible for a required and sufficient time.

According to a 12th aspect of the invention, there is provided a laser apparatus in any one of the first to fifth aspects, wherein the pressure of the laser gas of the laser oscillator is subjected to feedforward control based on the temperature of the specified component element of the laser apparatus.

Specifically, in the 12th aspect of the invention, the change in laser gas pressure can be predicted by estimating the temperature of the specified component element. By carrying out the feedforward control operation in such a manner as to cancel the laser gas pressure change, the controllability is improved over the simple feedback control.

All the aspects of the invention described above have a common effect that the laser machining operation can be conducted in a stable way for a long period of time without using a temperature sensor.

Further, in the second aspect of the invention, the temperature change or the temperature of a specified component element can be easily estimated.

Further, in the third aspect of the invention, a laser output value of a higher accuracy can be calculated.

Further, in the fourth aspect of the invention, the temperature can be estimated with a higher accuracy.

Further, in the fifth aspect of the invention, the temperature of a specified component element of the laser apparatus can be determined from the measured temperature and the laser output, and therefore the control operation can be performed with a higher accuracy by the estimated temperature.

Further, in the sixth aspect of the invention, a simple and accurate calculation is made possible using the exponential function or the first-order lag model.

Further, in the seventh aspect of the invention, a stable output can be produced.

Further, in the eighth aspect of the invention, the influence of the thermal lens effect can be corrected by changing the machining conditions.

Further, in the ninth aspect of the invention, the standby time before the thermal lens effect is stabilized can be reduced to the required minimum.

Further, in the tenth aspect of the invention, the laser power exceeding the critical output of the continuous operation, i.e. the continuous rated output can be produced.

Further, in the 11th aspect of the invention, the warm-up operation can be performed for the required and sufficient time.

Further, in the 12th aspect of the invention, the controllability can be improved as compared with the simple feedback control.

These and other objects, features and advantages of the present invention will be more apparent in light of the detailed description of exemplary embodiments thereof as illustrated by the drawings.

DETAILED DESCRIPTION OF THE INVENTION

Embodiments of the invention are described below with reference to the accompanying drawings.

Figure 1:
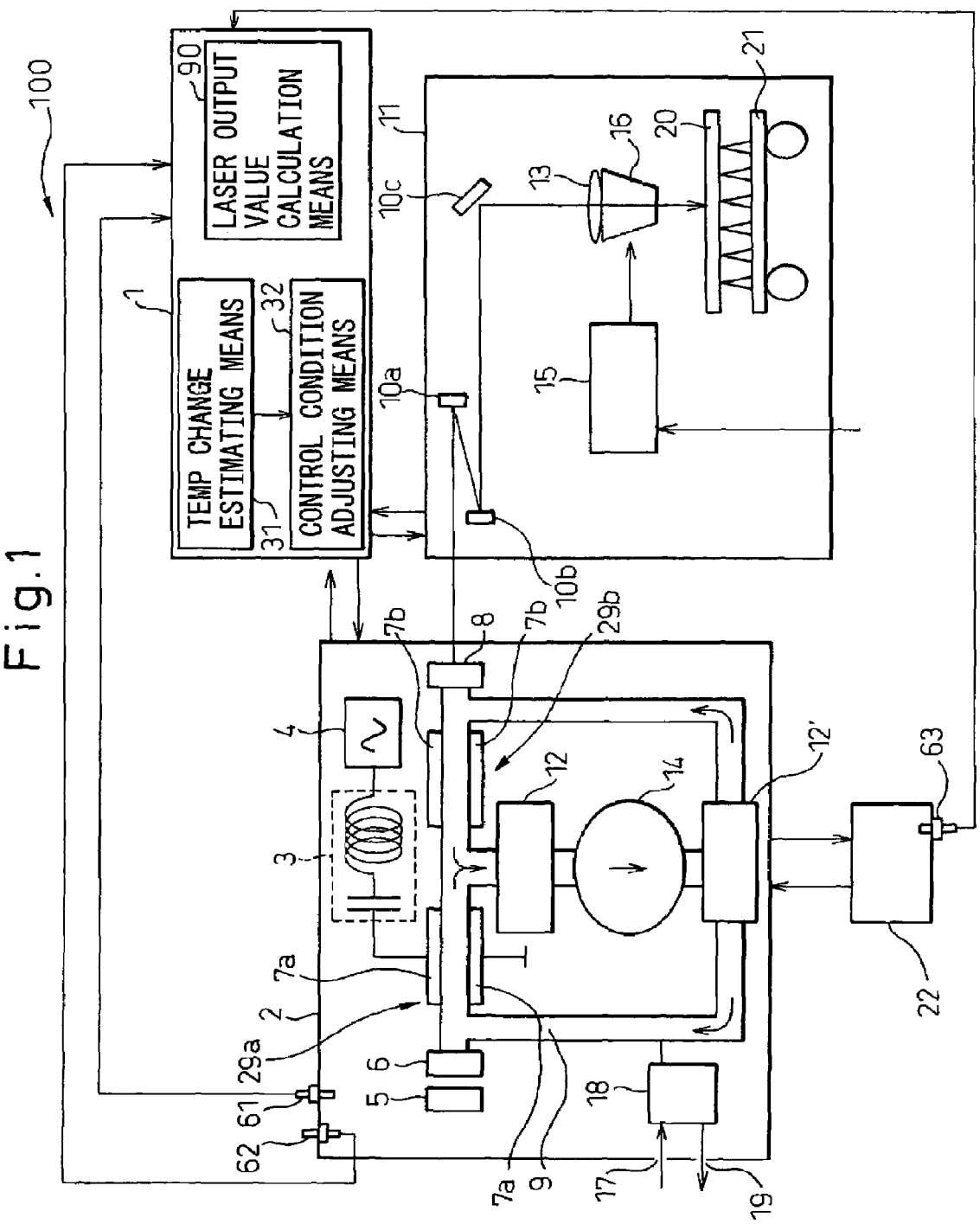
FIG. 1 is a schematic diagram showing a laser apparatus according to an embodiment of the invention.

FIG. 1 is a schematic diagram showing a laser apparatus according to an embodiment of the invention. The laser apparatus 100 according to this invention includes a laser oscillator 2 and a laser machine 11, which are connected electrically to each other through a control unit 1 as shown in FIG. 1.

The laser oscillator 2 is of induction discharge excitation type and includes a discharge tube 9 connected to a laser gas pressure control system 18. The laser gas pressure control system 18 can supply the laser gas to the discharge tube 9 through a laser gas supply port 17 and discharge the laser gas from the discharge tube 9 through a laser gas discharge port 19. A rear mirror 6 (internal mirror of the resonator) having a very small partial transmissibility is arranged at an end of the discharge tube 9, and an output mirror 8 having a partial transmissibility of several tens of percent is arranged at the other end of the discharge tube 9. A laser power sensor 5 is arranged on the back of the rear mirror 6. As shown in FIG. 1, two discharge sections 29a, 29b are formed in the optical resonation space between the rear mirror 6 and the output mirror 8.

The each of the discharge sections 29a, 29b include a pair of discharge electrodes 7a, 7b arranged at such positions as to sandwich the discharge tube 9. The discharge electrodes 7a, 7b are the same in size and each applied with a dielectric coating. As shown in FIG. 1, the discharge electrodes 7a are connected to a laser power supply 4 through a matching circuit 3. The discharge electrodes 7b are also connected to a laser power supply through a matching circuit, though not shown to facilitate the understanding. These laser power supplies are controlled independently to each other, and the power supplied from these laser power supplies to the corresponding discharge sections 29a, 29b can be freely adjusted.

Further, as shown in FIG. 1, the discharge tube 9 has a blower 14, and heat exchangers 12, 12' are arranged upstream and downstream, respectively, of the blower 14. The laser oscillator 2 is connected to a cooling water circulation system 22 so that the laser gas, etc. in the discharge tube 9 is appropriately cooled.

As shown in FIG. 1, temperature sensors 61, 62 for measuring the temperature Ti of the internal space of the laser oscillator 2 and the temperature To of the external space of the laser oscillator 2, respectively, are arranged on the laser oscillator 2. The cooling water circulation system 22 for the laser oscillator 2 includes a temperature sensor 63 for measuring the cooling water temperature Tw.

In place of the laser oscillator of a high-speed axial flow type shown in FIG. 1, a laser oscillator of other types such as a three-axis orthogonal oscillator or a gas slab laser of a heat-diffusion-cooling type may be employed.

The laser machine 11 includes a plurality of (three in FIG. 1) reflectors 10a, 10b, 10c for reflecting the laser output from the output mirror 8 of the laser oscillator 2. As shown, the laser reflected from the reflectors 10a, 10b, 10c is radiated onto a work 20 on a machining table 21 through a condensing lens 13 and a machining head 16. The work 20 can be set in position by changing the position of the machining table 21. As shown in FIG. 1, the laser machine 11 includes an assist gas supply system 15. The assist gas is supplied from an assist gas source (not shown) installed outside of the laser machine 11 to the desired position on the machining head 16 by the assist gas supply system 15.

The control unit 1 connecting between the laser oscillator 2 and the laser machine 11 is a digital computer including a ROM (read-only memory), a RAM (random access memory), a CPU (microprocessor) and input and output ports interconnected by a bidirectional bus. The input and output ports are appropriately connected to predetermined component elements of the laser oscillator 2 and the laser machine 11. The temperature sensors 61, 62, 63 shown in FIG. 1, for example, are each connected to the input port of the control unit 1 through a corresponding A/D converter (not shown). A pressure sensor (not shown) for detecting the pressure of the laser gas in the discharge tube 9 is also connected to the input port of the control unit 1. This configuration permits the control unit 1 to operate as a temperature change estimation means 31 and a control condition adjusting means 32 described later.

When the laser apparatus 100 is in operation, the laser gas is supplied into the discharge tube 9 through the laser gas supply port 17 by the laser gas pressure control system 18. Then, the laser gas is circulated through a circulation path including the discharge tube 9 by the blower 14. As indicated by arrows in FIG. 1, the laser gas sent out from the blower 14 is supplied to the discharge sections 29a, 29b through the heat exchanger 12' for removing the compression heat.

Upon application of an AC voltage of a predetermined value, e.g. several hundred kHz to several tens of MHz by the discharge electrodes 7a, 7b in the discharge sections 29a, 29b, the laser gas is excited by the discharge action thereby to generate a laser. According to the well-known principle, the laser is amplified in an optical resonance space, so that an output laser is recovered through the output mirror 8. The laser gas heated to a high temperature by the discharge action is cooled by the heat exchanger 12 and returned to the blower 14. In the process, the cooling water circulation system 22 is activated to cool the laser gas, etc. in the discharge tube 9.

The laser recovered from the output mirror 8 is supplied to the laser machine 11 from the laser oscillator 2 as shown. In the laser machine 11, the laser is appropriately reflected by three reflectors 10a, 10b, 10c. The laser thus reflected is converged by the condensing lens 13, and through the machining head 16, radiated on the work 20. As a result, the work 20 on the machining table 21 is cut, welded or otherwise machined.

In this laser apparatus 100, the magnitude of the discharge injection power is determined using the phase difference between the discharge voltage waveform and the discharge current waveform in the discharge electrodes 7a, 7b. The laser apparatus 100 has the matching circuit 3 for adjusting this phase difference to supply the discharge energy efficiently to the laser gas. The temperature of specified component elements such as the discharge electrodes 7a, 7b in the laser apparatus 100, however, increases in accordance with the elapsed time and the laser output of the laser apparatus 100 in operation. With the temperature change of the discharge electrodes 7a, 7b, the impedance characteristic between the discharge electrodes 7a and between the discharge electrodes 7b undergoes a change. As a result, the characteristic of the whole power circuit changes and so does the discharge injection efficiency. As a result, the discharge characteristic of the discharge electrodes 7a, 7b changes, with the result that a difference develops between the laser output command value and the actual laser output value.

In accordance with the temperature of the discharge electrodes 7a, 7b, therefore, the peak output of the output command value or the pulse duty cycle of the laser is adjusted thereby to suppress the difference between the actual laser output and the laser output command value.

The discharge electrodes 7a, 7b are cooled by the cooling water, etc. from the cooling water circulation system 22 and the laser gas in the discharge tube 9. Even in the case where the output of the laser apparatus 100 is set to a maximum value, therefore, the temperature of the discharge electrodes 7a, 7b does not rise to more than a certain level. Then, by reducing the laser output to a predetermined value, the temperature of the discharge electrodes 7a, 7b is gradually decreased by the cooling action described above.

As described above, it is difficult to detect the temperature of the discharge electrodes with a temperature sensor. According to the invention, therefore, the temperature or the temperature change of specified component elements such as the discharge electrodes 7a, 7b is estimated by use of a temperature change estimation means 31.

Figure 2:
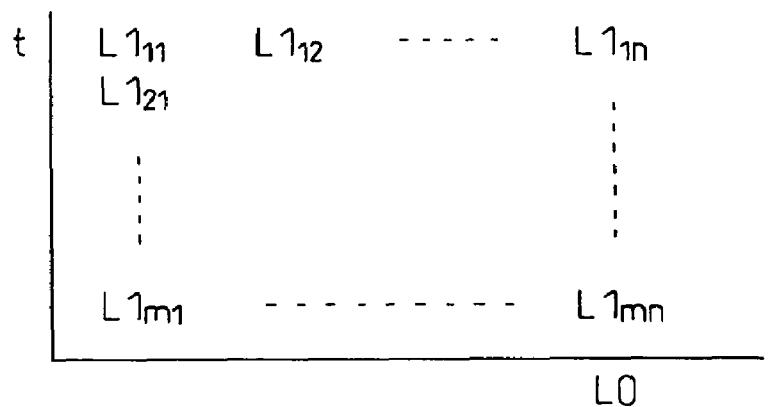
FIG. 2a shows a map of a laser output L1.
FIG. 2b shows a map of the laser output L1 and the temperature Te of a specified component element.
FIG. 2c shows a map of the temperature Te of a specified component element and a peak output P.
FIG. 2d shows a map of the temperature Te of a specified component element and the pulse duty D.

When estimating the temperature of the specified component elements such as the discharge electrodes 7a, 7b with the temperature change estimation means 31, a laser output value calculation means 90 is used. For example, the laser output value calculation means 90 may be a map of the actual laser output L1, as shown in FIG. 2a, experimentally obtained as functions of the elapsed time t and the laser output command value L0. This map is previously stored in the ROM or RAM of the control unit 1. Using this map, a corresponding laser output L1 is determined from the laser output command value L0 and the elapsed time t. As an alternative, the discharge voltage and/or the discharge current may be calculated from the laser output command value L0 based on another map not shown, and the laser output L1 may be determined from the calculated discharge voltage and/or discharge current. As another alternative, the laser output L1 providing an average value may be determined from a map (not shown) with functions of the laser output command value L0, the peak value of the laser output command value L0, the command pulse frequency and the command pulse duty cycle. In this way, an accurate value of the laser output can be easily determined.

Then, the temperature Te of the discharge electrodes 7a, 7b is estimated from another map (FIG. 2b) indicating the relation between the laser output L1 and the temperature Te of specified component elements such as the discharge electrodes 7a, 7b. The map shown in FIG. 2b and the map described later are both assumed to be stored in the ROM or RAM of the control unit 1. When the temperature of determining specified component elements other than the discharge electrodes 7a, 7b, a similar map (not shown) prepared for the particular specified component elements of course is used.

The temperature Te of the specified component elements such as the discharge electrodes 7a, 7b may be calculated from a predetermined formula without using the map. The calculation formula used for this purpose is an exponential function model or a first-order lag model formula. By using such formula, the temperature Te can be accurately calculated with comparative ease.

Next, based on the temperature Te of the specified component elements such as the discharge electrodes 7a, 7b estimated by the temperature change estimation means 31, the peak output P of the laser output command value L0 or the pulse duty cycle D is adjusted. Also in this case, the peak output P and/or the pulse duty cycle D is determined from the map for the peak output P shown in FIG. 2c or the map for the pulse duty cycle D shown in FIG. 2d.

The peak output P and the pulse duty cycle D thus determined are supplied to the control condition adjusting means 32, and based on the peak output P and the pulse duty D, the conditions for controlling the laser of the laser oscillator 2 are adjusted by the control condition adjusting means 32. The discharge voltage and/or the discharge current at the time of output is adjusted, so that the peak output or the pulse duty cycle of the laser output command value is adjusted in accordance with the temperature of the discharge electrodes 7a, 7b. As a result, the difference between the actual laser output and the laser output command value is suppressed. Alternatively, the difference between the actual laser output and the laser output command value may be suppressed by adjusting the voltage and/or the current at the time of simmer discharge state.

As described above, according to this invention, the conditions for controlling the laser of the laser apparatus 100 can be adjusted without actually measuring the temperature of specified component elements, i.e. without using the temperature sensor for the specified component elements, thereby making possible a stable machining operation over a long period of time. In the case where a more satisfactory control operation is desired, the capacitance and/or the reactance in the matching circuit 3 is dynamically controlled preferably based on the temperature Te of the specified component elements such as the discharge electrodes 7a, 7b.

In this invention, the laser output L1 is an average value of the laser output over a predetermined period of time, such as about 0.5 seconds. The laser output L1 is formed of repetitive pulses within a comparatively short period of several tens of Hz to several kHz, while the temperature Te of the specified component elements such as the discharge electrodes 7a, 7b undergoes a change for a comparatively long time of the order of several seconds to several minutes. According to the invention, therefore, the average value for a predetermined time is used as the laser output L1 to facilitate calculations. The laser output L1 is a value obtained from the map after lapse of a sufficiently long time to achieve stability, say, several tens of seconds, and by an appropriate complementary computing of this value, the laser output of the above-mentioned predetermined value is preferably determined. In such a case, the amount of calculations is considerably reduced as compared with the sequential calculations of the laser output, while at the same time reducing the load imposed on the CPU of the control unit 1.

In similar fashion, the laser output L1 as an average value can be determined from a map (not shown) as functions of the command discharge voltage value, the command discharge current value, the command pulse frequency and the command pulse duty cycle. In such a case, a command discharge voltage value more closely related to the discharge electrodes 7a, 7b is used, and therefore the laser output L1 of a higher accuracy can be calculated.

According to another embodiment, the laser output L1, instead of being determined from a map, can be directly detected by using the laser power sensor 5. Then, using the same method as described above, the temperature Te of the component elements such as the discharge electrodes 7a, 7b is calculated. According to this embodiment, the actual laser output L1 is directly measured, and therefore the temperature change of the specified component elements such as the discharge electrodes 7a, 7b can be estimated more precisely. In the case where the response rate from the laser power sensor 5 is slow, the laser output stabilized after a lapse of a predetermined time following the laser output may be detected by the laser power sensor 5, and the laser output L1 determined from the map described above is corrected using the value detected by the laser power sensor 5.

Actually, the estimated temperature Te of the specified component elements is the sum of the reference temperature T0 and the temperature change $\Delta T$ (Te=T0+$\Delta T$). The reference temperature T0 is a value predetermined by the installation environment of the laser apparatus 100 or, for example, the temperature of the room in which the laser apparatus 100 is installed (i.e. the temperature To of the external space of the laser oscillator 2), the temperature Ti of the internal space of the laser oscillator 2 or the temperature Tw of the cooling water used in the cooling water circulation system 22. Strictly, therefore, the temperature change estimation means 31 is considered to estimate the temperature change amount $\Delta T$.

Normally, the temperature of the room in which the laser apparatus 100 is installed and the temperature Tw of the cooling water of the cooling water circulation system 22 arranged in the laser oscillator 2 are managed comparatively strictly. Nevertheless, the temperatures To, Ti, Tw, which vary from one season to another, are high in summer and low in winter. Also, in a specified area, the cooling water temperature Tw cannot be maintained at a constant level for technical and economic reasons.

In the case where any one of the temperatures To, Ti, Tw is used as the reference temperature T0, therefore, the reference temperature T0 is not always constant. In such a case, therefore, the temperature sensors 61, 62, 63 shown in FIG. 1 are used to detect the temperature Ti of the internal space of the laser oscillator 2, the temperature To of the external space of the laser oscillator 2 and the temperature Tw of the cooling water of the cooling water circulation system 22. Based on these temperatures, the reference temperature T0 is changed and the estimated temperature Te (Te=T0+$\Delta T$) is calculated. As a result, the laser output L1 higher in stability against the change in the external environment can be obtained.

The discharge electrodes 7a, 7b are referred to as specified component elements in the embodiments described above. Nevertheless, the temperature of any other specified component elements such as the laser gas, YAG (yttrium-aluminum-garnet) crystal (not shown), the output mirror 8, the condensing lens 13, the excitation light lamp (not shown) and the laser diode (not shown) may alternatively be estimated. The temperature of these specified component elements can also be determined by a method similar to the one described above. Of course, it is also possible to estimate the temperature of some of the plurality of the specified component elements by the temperature change estimation means 31 and, based on these plurality of temperatures, control the laser oscillator 2 of the laser apparatus 100 by the control condition adjusting means 32. In the case where the laser oscillator 2 is of DC discharge type, a conductive electrode is also assumed to be included in the specified component elements.

As described above, according to this invention, the laser oscillator 2 is controlled by the control condition adjusting means 32 based on the temperature Te of the specified component elements estimated by the temperature change estimation means 31. The control condition adjusting means 32 can be used for controlling the laser machine 11 of the laser apparatus 100.

Figure 3:
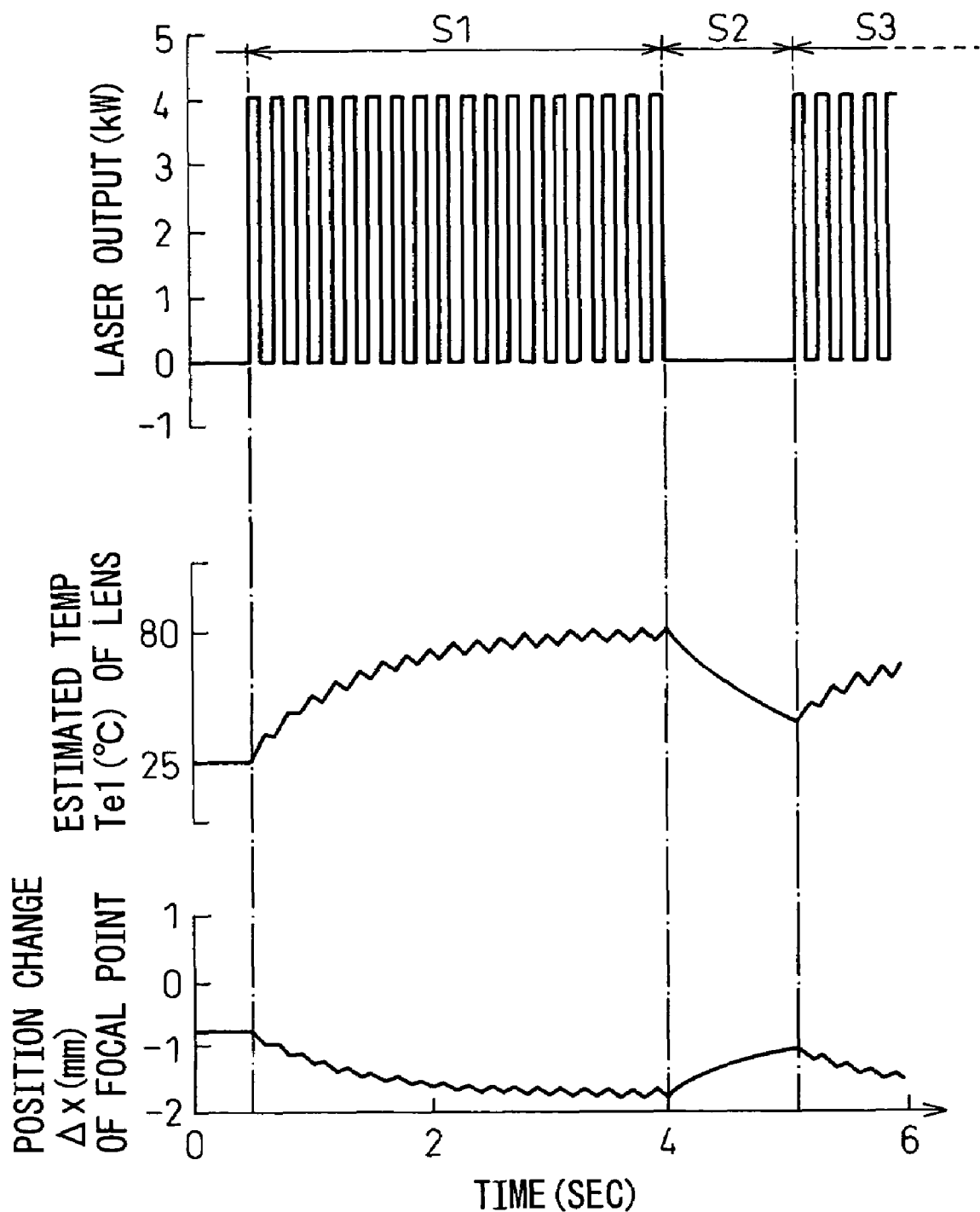
FIG. 3 is a diagram showing the output, the temperature of the condensing lens and the relation between the position change of the focal point and time.

FIG. 3 is a diagram showing the relation of the laser output, the temperature of the condensing lens and the position change of the focal point with time. As shown in FIG. 3, upon transmission of a laser output command in pulse form during the period S1, the laser is output from the output mirror 8 as described above. As a result, the temperature Te1 (estimated temperature) of the condensing lens 13 gradually increases. With the temperature increase of the condensing lens 13, however, the thermal lens effect changes the laser beam diameter, and therefore the position of the focal point of the laser on the work 20 is displaced. It is understood that the position of the focal point is displaced in the opposite direction to the reference direction during the period S1 shown in FIG. 3.

Upon cancellation of the laser output command during the period S2, the temperature Te1 of the condensing lens 13 is naturally decreases. In the case where the laser is radiated, therefore, the focal point is also changed in the direction to obviate the displacement. Upon issue of the laser output command again during the period S3, the temperature Te1 of the condensing lens 13 starts to rise, and the focal point is changed again in the direction to cause the displacement. In other words, it is understood that the higher the temperature Te1 of the condensing lens 13, the larger the displacement of the focal point. The displacement of the focal point makes unstable the machining operation of the work 20 in the laser machine 11.

For this reason, according to this invention, the temperature Te1 of the condensing lens 13 is estimated by the temperature change estimation means 31, and with reference to FIG. 3, the position change $\Delta x$ of the focal point is determined from the temperature Te1. Then, the position change $\Delta x$ is sent to the control condition adjusting means 32, which controls the machining table 21 to move in the direction toward zero in position change $\Delta x$. As a result, even in the case where the temperature of the condensing lens 13 rises, the work 20 can be machined while adjusting the position change $\Delta x$ of the focal point, and therefore the unstable machining operation of the work 20 is avoided.

In this case, the temperature Te1 of the condensing lens 13 may be determined and the machining table 21 adjusted only once, for example, during the period S1. Alternatively, the temperature Te1 of the condensing lens 13 may be determined a plurality of times and the machining table 21 adjusted a plurality of times, for example, during the period S1.

In the case where the reflectors 10a to 10c in FIG. 1 are variable curvature mirrors, the position change $\Delta x$ can be reduced to zero by changing the curvature of the reflectors 10a to 10c in accordance with the temperature increase of the condensing lens 13. It is of course possible to adjust both the position of the machining table 21 and the curvature of the reflectors 10a to 10c in accordance with the temperature increase of the condensing lens 13. In such a case, the position change Δx can be obviated within a shorter time.

A protracted operation of the laser apparatus 100 contaminates the specific component elements of the optical system, and the laser output gradually decreases. It is therefore necessary to correct the average laser output value L1 determined by the estimated temperature Te of the component elements such as the discharge electrodes 7a, 7b. Thus, a fixed rated command is issued periodically over a predetermined length of time and after the laser output is sufficiently stabilized, the laser output value L1 calculated from the estimated temperature of the specified component elements of the optical system is compared with the laser output value calculated from the laser power sensor 5. The difference between these laser output values is corrected preferably by being added to the laser output L1. As a result, even after a protracted operation, the laser output L1 can be accurately obtained.

Further, in the case where the specified component elements of the optical system are contaminated and the laser output is reduced, the laser propagation characteristic and the beam diameter also change. By adjusting the distance covered by the machining table 21 or the curvature of the reflectors 10a to 10c in the case the reflectors may be curvature variable mirrors, the work 20 can be machined in stable fashion even when the specified component elements of the optical system are contaminated.

As described above, the thermal lens effect is generated by the temperature increase of the condensing lens 13 of the laser apparatus 100. This thermal lens effect is settled upon lapse of a comparatively short time, say, several seconds after generation thereof. Then, the work 20 can be machined with comparative stability. It is therefore desirable not to machine the work with laser before the temperate of the condensing lens 13 reaches a predetermined value.

Figure 4A:
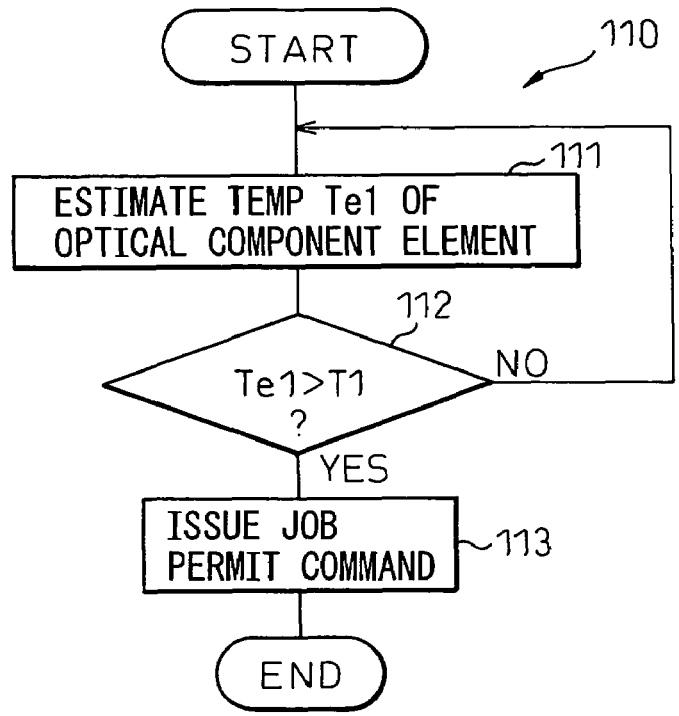
FIG. 4a is a flowchart showing an operating program of the laser apparatus according to the invention.

FIG. 4a is a flowchart showing an operating program of the laser apparatus according to the invention. This program 110 and the programs 120, 130, 140 described later are assumed to be incorporated in the ROM or RAM of the control unit 1 in advance. In the case of the program 110 shown in FIG. 4a, the work 20 is pierced by the laser machine 11 and, even after complete piercing process, the laser continues to be radiated. In the process, the laser is radiated only on the pierced hole and therefore the work itself is not machined.

At step 111 of the program 110, the temperature Te1 of a specified component element of the optical system, or in this case, the condensing lens 13 is estimated by the method described above. The laser continues to be radiated until the temperature Te1 of the condensing lens 13 estimated by the temperature change estimation means 31 exceeds a predetermined temperature T1. The predetermined temperature T1 is the one at which it can be determined that a sufficient time to settle the thermal lens effect of the condensing lens 13 has passed.

Then, in step 112 it is determined whether the estimated temperature Te1 of the condensing lens 13 is higher than the predetermined temperature T1 or not. In the case where the determination is that the estimated temperature Te1 of the condensing lens 13 is higher than the predetermined temperature T1, the process proceeds to step 113. In the case under consideration, it is determined that the thermal lens effect of the condensing lens 13 has already been settled and therefore the machining table 21 is moved to start the machining, or in this case, cutting the work 20. As a result, the work 20 can be machined in stable fashion within the required minimum time. In the case where step 112 determines that the estimated temperature Te1 of the condensing lens 13 is not higher than the predetermined temperature T1, on the other hand, the process returns to step 111, and until the estimated temperature Te1 of the condensing lens 13 exceeds beyond the predetermined temperature T1, i.e. until it can be determined that the thermal lens effect is settled, the process is repeated.

Especially in the case where the laser output command value is frequently changed, only a predetermined standby time is set each time in the prior art. According to the invention, in contrast, it is determined whether the work 20 is to be machined or not based on the estimated temperature of the condensing lens 13, and therefore the standby time for the laser machining is reduced to the required minimum, resulting in an improved productivity.

This is also the case with the cooling process of the condensing lens 13. In the case where laser marking is done with a laser cutting process, the marking is machined with a very small output as compared with the cutting process. To start the marking immediately after the cutting process, therefore, a standby is required until the condensing lens is stabilized at a temperature corresponding to the small output. According to this invention, the completion time of the cooling process of the condensing lens 13 can be estimated, and therefore the standby time can be reduced.

In the program 110 shown in FIG. 4a, the temperature Te1 of the condensing lens 13 is estimated. As an alternative, the temperature of the YAG crystal (not shown) of the YAG laser rod, for example, may be estimated. By not applying the laser until the YAG crystal reaches a predetermined temperature, the variation in the laser beam diameter at the incidence portion is reduced, and therefore the risk of burning the optical fiber used in the incidence portion is reduced.

Figure 4B:
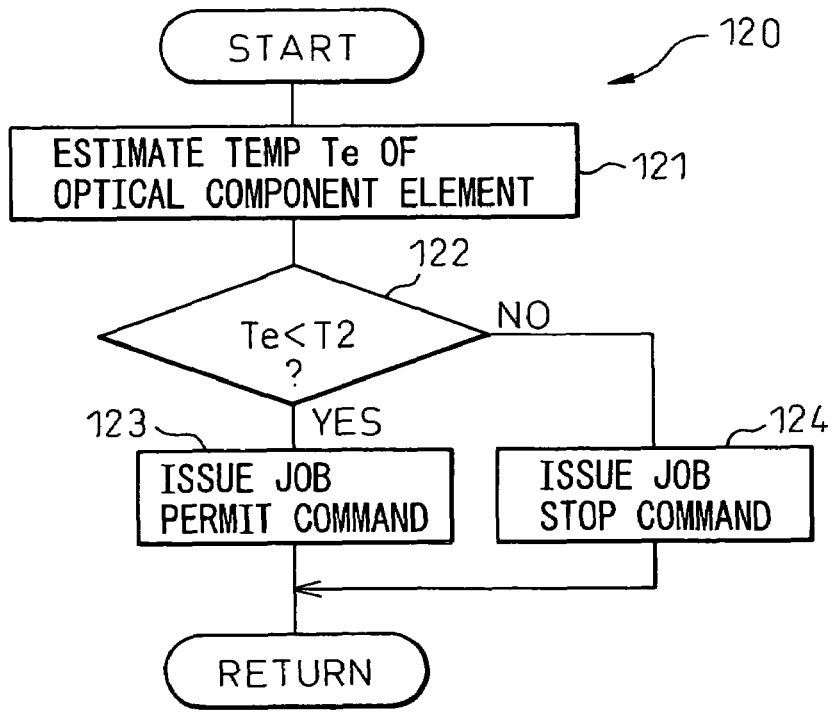
FIG. 4b is a flowchart showing another operating program of the laser apparatus according to the invention.

In the case where the welding job is carried out by the laser machine 11 of the laser apparatus 100, the laser output is preferably increased up to about the critical value beyond the rated output even only for a comparatively short time. FIG. 4b is a flowchart showing another operating program of the laser apparatus according to the invention. At step 121 of this program 120, the temperature Te of the specified component elements is estimated similarly, followed by step 122 to determine whether the estimated temperature Te is lower than the predetermined temperature T2 or not. If the predetermined temperature T2 is a maximum temperature at which the laser oscillator 2 can operate, and is higher than the temperature T1 described above, in the case where the estimated temperature Te is lower than the predetermined temperature T2, the process proceeds to step 123 and the laser machine 11 is used as it is. As a result, the laser machine 11 can be used up to the very limit at which the estimated temperature Te reaches the predetermined temperature T2. In the case where the estimated temperature Te is not lower than the predetermined temperature T2, on the other hand, the process proceeds to step 124, where the laser of the laser oscillator 2 is stopped and the laser oscillator 2 is cooled as required. According to this embodiment, therefore, the laser apparatus 100 can be used up to the output limit, though only for a comparatively short time.

Figure 5A:
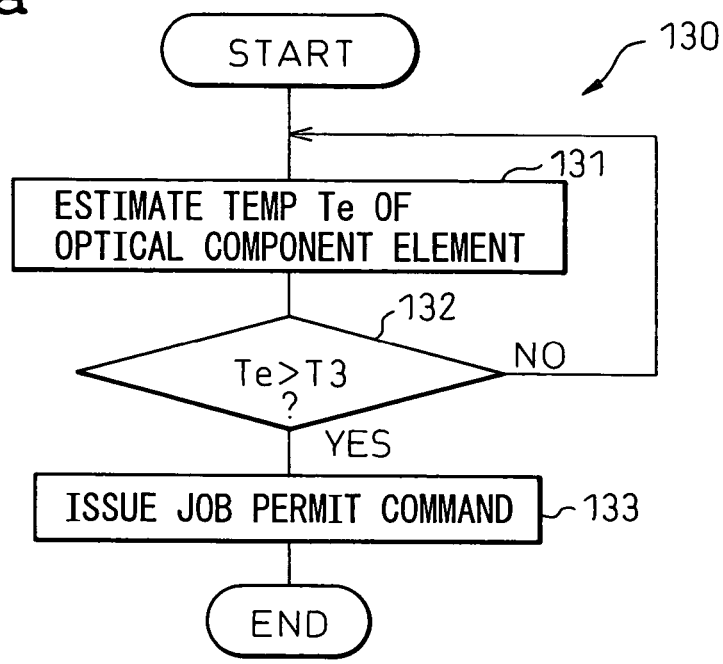
FIG. 5a is a flowchart showing still another operating program of the laser apparatus according to the invention.

Further, based on the estimated temperature Te of the specified component elements estimated by the temperature change estimation means 31, it may be determined whether the warm-up operation of the laser apparatus 100 is complete or not. FIG. 5a is a flowchart showing still another operating program for the laser apparatus according to the invention used in such a case. At step 131 of the program 130 shown in FIG. 5a, the temperature Te of the specified component elements is estimated similarly by the temperature change estimation means 31. Then, the process proceeds to step 132 to determine whether the estimated temperature Te is higher than the predetermined temperature T3 or not. The predetermined temperature T3 is the one sufficient for determination that the warm-up operation of the laser apparatus 100 is complete, and is assumed to be lower than the temperature T1 described above. In the case where it is determined that the estimated temperature Te is higher than the predetermined temperature T3, the process proceeds to step 133, where it is determined that the warm-up operation is complete and the work 20 begins to be machined by the laser machine 11. In the case where the determination is that the estimated temperature Te is not higher than the predetermined temperature T3, on the other hand, the process proceeds to step 131, and the process is repeated until it can be determined that the estimated temperature Te is higher than the predetermined temperature T3, i.e. the warm-up operation is complete. In this process, the warm-up operation time may be the required minimum time. Therefore, the actual machining process of the work 20 can started quickly.

In the laser oscillator 2, with rise and fall of the laser output, part of the laser gas in the discharge tube 9 is thermally expanded, and therefore the pressure in the sealed space of the laser gas in the discharge tube 9 is increased, thereby changing the blowing resistance of the laser gas. This causes an overshoot or an undershoot of the laser gas pressure, and therefore the actual laser output is made unstable. Although this overshoot or undershoot is obviated by the laser gas pressure control system 18 which restores the internal pressure of the discharge tube 9 to a predetermined level, a certain length of time is required before the laser output is stabilized by the laser gas pressure control system 18 alone. For this reason, at the time of rise and fall of the laser output, the pressure of the discharge tube 9 is preferably controlled, especially by feedforward, based on the estimated temperature Te of the specified component elements obtained by the temperature change estimation means 31 in addition to the pressure value obtained by a pressure sensor (not shown).

Figure 5B:
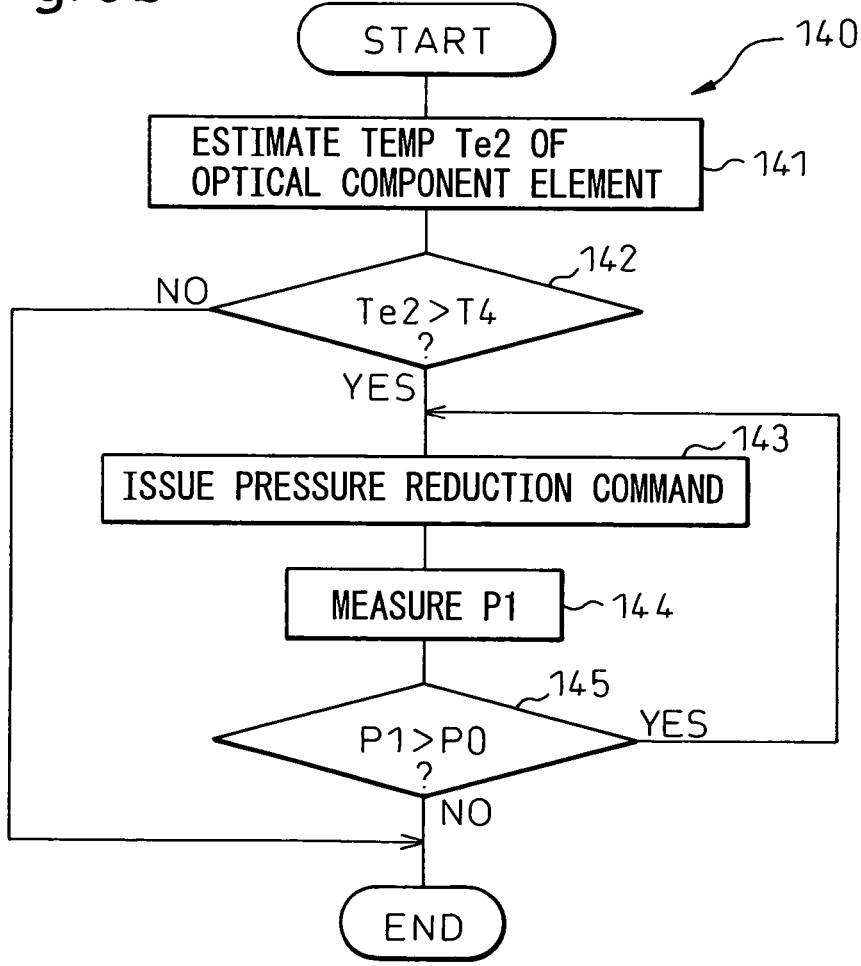
FIG. 5b is a flowchart showing yet another operating program of the laser apparatus according to the invention.

FIG. 5b is a flowchart showing another operating program of the laser apparatus according to the invention used in such a case. At step 141 of the program 140 in FIG. 5b, the temperature Te2 of the specified component elements or in this case, the discharge sections 29a, 29b or immediately downstream of the discharge sections 29a, 29b is estimated by the similar method as described above. Then, at step 142, it is determined whether the estimated temperature Te2 is higher than the predetermined temperature T4 or not. The predetermined temperature T4 is assumed to be a temperature at which the pressure of the discharge tube 9 can be sufficiently controlled by the laser gas pressure control system 18 alone.

Upon determining that the estimated temperature Te2 is higher than the predetermined temperature T4, the process proceeds to step 143, at which the pressure of the discharge tube 9 is reduced by a predetermined small amount by the laser gas pressure control system 18. In the case where step 142 determines that the estimated temperature Te2 is not higher than the predetermined temperature T4, on the other hand, it is determined that the pressure control operation by the laser gas pressure control system 18 alone is sufficient and the process is terminated.

Then, the process proceeds to step 144, and the pressure P1 of the discharge tube 9 is detected by a pressure sensor not shown. In step 145, it is determined whether the detected pressure P1 is higher than a predetermined pressure P0 or not, and upon determination that the pressure P1 is higher than the predetermined pressure P0, the process returns to step 143 to execute the pressure reduction process described above. After that, in the case where the new pressure P1 detected again at step 144 is still higher than the predetermined pressure P0 at step 145, the process returns to step 143 to repeat the pressure reduction process. Upon determination at step 145 that the pressure P1 is not higher than the predetermined pressure P0, on the other hand, the process is terminated.

In such a case, the pressure rise of the discharge tube 9 is predicted from the estimated temperature Te2 of the discharge sections 29a, 29b, etc., and the pressure reduction operation of the discharge tube 9 is executed by feedforward control in advance. At the time of an overshoot, therefore, the pressure can be reduced to the predetermined pressure P0 more quickly than in the prior art. Though not shown in the drawings, substantially the same method can be employed to control the pressure at the time of an undershoot, according to the invention.

Although the invention has been shown and described with exemplary embodiments thereof, it will be understood, by those skilled in the art, that the foregoing and various other changes, omissions and additions may be made therein and thereto without departing from the spirit and scope of the invention.

The invention claimed is:

1. A laser apparatus, comprising:
    a laser oscillator;
    a laser machine for conducting a laser machining operation by condensing the laser light output from the laser oscillator;
    a laser output value calculation means for calculating the laser output value, based on a command value to the laser oscillator;
    a temperature change estimation means for estimating a selected one of the temperature change and a temperature of a specified component element of the laser apparatus based on the laser output value calculated by the laser output value calculation means and elapsed time; and
    an adjusting means for adjusting a selected one of conditions for laser control operation of the laser oscillator and of conditions for the laser machining operation of the laser machine based on a selected one of the temperature and the temperature change of the specified component element estimated by the temperature change estimation means.

2. A laser apparatus according to claim 1, wherein the laser output value is calculated using at least one of the laser output command value, a command output peak value, a command pulse frequency and a command pulse duty cycle.

3. A laser apparatus according to claim 1, wherein the laser output value is calculated using at least a selected one of the command discharge voltage value, the command discharge current value, the command pulse frequency and the command pulse duty cycle.

4. A laser apparatus, comprising:
    a laser oscillator;
    a laser machine conducting the laser machining operation by condensing the laser light output from the laser oscillator;
    a laser output value measuring means for measuring the laser output value through a laser power sensor;
    a temperature change estimating means for estimating a selected one of a temperature change and a temperature of a specified component element of the laser apparatus, based on the laser output value measured by the laser output value measuring means and an elapsed time; and an adjusting means for adjusting a selected one of the conditions for the laser control operation of the laser oscillator and the conditions for the laser machining operation of the laser machine based on a selected one of the temperature change and the temperature of the specified component element estimated by the temperature change estimation means.

5. A laser apparatus according to claim 1, wherein the temperature of the specified component element is estimated based on a selected one of an internal temperature or an external temperature of the laser apparatus or a temperature of cooling water for the laser oscillator and a temperature change estimated by the temperature change estimating means.

6. A laser apparatus according to claim 1, wherein a selected one of the temperature change and the temperature of the specified component element of the laser apparatus is calculated from a selected one of an exponential function model and a first-order lag model.

7. A laser apparatus according to claim 1, wherein the specified component element of the laser apparatus is at least a selected one of a discharge tube, a discharge electrodes, a laser gas, an excitation light lamp and a excitation laser diode.

8. A laser apparatus according to claim 1, wherein the specified component element of the laser apparatus is a selected one of a condensing lens and a variable curvature mirror and the conditions for the laser machining operation are a selected one of the distance between the condensing lens and the work and the curvature of the variable curvature mirror.

9. A laser apparatus according to claim 1, wherein the laser machining operation is suspended until the temperature of the specified component element of the laser apparatus reaches a predetermined temperature.

10. A laser apparatus according to claim 1, wherein the operation of the laser apparatus is suspended in a case where the temperature of the specified component element of the laser apparatus reaches a predetermined critical temperature.

11. A laser apparatus according to claim 1, wherein in the case where a temperature of the specified component element of the laser apparatus reaches a predetermined warm-up completion temperature, it is determined that the warm-up operation for starting the laser apparatus is completed.

12. A laser apparatus according to claim 1, wherein the pressure of a laser gas of a laser oscillator is subjected to a feed forward control based on a temperature of the specified component element of the laser apparatus.

13. A laser apparatus according to claim 4, wherein a temperature of the specified component element is estimated, based on a selected one of the internal temperature or the external temperature of the laser apparatus or a temperature of cooling water for the laser oscillator and the temperature change estimated by the temperature change estimating means.

14. A laser apparatus according to claim 13, wherein a selected one of the temperature change and the temperature of the specified component element of the laser apparatus is calculated from a selected one of an exponential function model and a first-order lag model.

15. A laser apparatus according to claim 13, wherein the specified component element of the laser apparatus is at least a selected one of a discharge tube, a discharge electrodes, a laser gas, an excitation light lamp and an excitation laser diode.

16. A laser apparatus according to claim 13, wherein the specified component element of the laser apparatus is selected one of a condensing lens and a variable curvature mirror and the conditions for the laser machining operation are a selected one of a distance between the condensing lens and the work and the curvature of the variable curvature mirror.

17. A laser apparatus according to claim 13, wherein the laser machining operation is suspended until the temperature of the specified component element of the laser apparatus reaches a predetermined temperature.

18. A laser apparatus according to claim 13, wherein the operation of the laser apparatus is suspended in a case where the temperature of the specified component element of the laser apparatus reaches a predetermined critical temperature.

19. A laser apparatus according to claim 13, wherein in the case where the temperature of the specified component element of the laser apparatus reaches a predetermined warm-up completion temperature, it is determined that the warm-up operation for starting the laser apparatus is completed.

20. A laser apparatus according to claim 13, wherein a pressure of a laser gas of the laser oscillator is subjected to feed forward control based on the temperature of the specified component element of the laser apparatus.

* * * * *

UNITED STATES PATENT AND TRADEMARK OFFICE
CERTIFICATE OF CORRECTION

PATENT NO.        : 7,257,136 B2                                Page 1 of 1
APPLICATION NO.   : 11/230653
DATED             : August 14, 2007
INVENTOR(S)       : Atsushi Mori et al.

It is certified that error appears in the above-identified patent and that said Letters Patent is hereby corrected as shown below:

Column 17, Line 26, change "electrodes," to --electrode,--.

Column 18, Line 19, change "electrodes," to --electrode,--.

Signed and Sealed this

Eighteenth Day of December, 2007

JON W. DUDAS
*Director of the United States Patent and Trademark Office*